(12) United States Patent
Thach et al.

(10) Patent No.: US 7,055,732 B2
(45) Date of Patent: Jun. 6, 2006

(54) SEMICONDUCTOR PROCESSING APPARATUS INCLUDING PLASMA-RESISTANT, WELDED ALUMINUM STRUCTURES

(75) Inventors: Senh Thach, Union City, CA (US); Jennifer Y. Sun, Sunnyvale, CA (US); Shun Jackson Wu, Cupertino, CA (US); Yixing Lin, Saratoga, CA (US); Clifford C. Stow, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 60 days.

(21) Appl. No.: 10/652,663

(22) Filed: Aug. 28, 2003

(65) Prior Publication Data

US 2004/0041004 A1 Mar. 4, 2004

Related U.S. Application Data

(63) Continuation of application No. 10/086,003, filed on Feb. 26, 2002, now Pat. No. 6,659,331.

(51) Int. Cl.
*B23K 20/12* (2006.01)
*B23K 37/00* (2006.01)
*B23K 31/02* (2006.01)

(52) U.S. Cl. ............... 228/2.1; 228/112.1; 228/113; 228/114.5

(58) Field of Classification Search ........... 228/112.1, 228/113, 114, 114.5, 262.5; 148/415, 417, 148/437, 440, 277
See application file for complete search history.

(56) References Cited

U.S. PATENT DOCUMENTS

| | | | | |
|---|---|---|---|---|
| 3,078,563 A | * | 2/1963 | Gould et al. ............... | 228/208 |
| 3,478,410 A | * | 11/1969 | Squibb et al. ............ | 228/112.1 |
| 5,248,077 A | | 9/1993 | Rhoades et al. .......... | 228/112.1 |
| 5,653,377 A | | 8/1997 | Reatherford et al. ...... | 228/114.5 |
| 6,045,028 A | | 4/2000 | Martin et al. ............. | 228/112.1 |
| 6,105,849 A | | 8/2000 | Mochizuki et al. ....... | 228/112.1 |
| 6,230,957 B1 | | 5/2001 | Arbegast et al. .......... | 228/112.1 |
| 6,237,834 B1 | * | 5/2001 | Mahoney et al. ......... | 228/112.1 |
| 6,299,706 B1 | | 10/2001 | Miyake et al. ............. | 148/415 |
| 6,302,315 B1 | | 10/2001 | Thompson ............... | 228/112.1 |
| 6,444,059 B1 | | 9/2002 | Raynaud et al. ............ | 148/440 |
| 6,528,183 B1 | | 3/2003 | Dif et al. .................... | 428/654 |
| 6,544,357 B1 | * | 4/2003 | Hehmann et al. ........... | 148/420 |
| 6,659,331 B1 | * | 12/2003 | Thach et al. ............. | 228/112.1 |

(Continued)

FOREIGN PATENT DOCUMENTS

EP 0383550 8/1990

(Continued)

OTHER PUBLICATIONS

K. Katoh et al., "Weld Interface of Friction Welded Joints of Aluminum Alloy Composite to Aluminum Alloys", Journal of Light Metal Welding & Construction, vol. 32, No. 10, pp. 429-434 (1994).

(Continued)

*Primary Examiner*—Lynne R. Edmondson
(74) *Attorney, Agent, or Firm*—Shirley L. Church (57) ABSTRACT

We have discovered a method of producing a complex-shaped aluminum alloy article, where welding has been employed to form the article, where an anodized aluminum coating is produced over a surface of the article including the weld joint, and where the anodized aluminum coating is uniform, providing improved performance over that previously known in the art for welded articles exposed to a corrosive plasma environment.

23 Claims, 6 Drawing Sheets

U.S. PATENT DOCUMENTS

| | | | |
|---|---|---|---|
| 6,727,691 B1 * | 4/2004 | Goldfine et al. | 324/240 |
| 2001/0015370 A1 | 8/2001 | Matsunaga et al. | 228/112.1 |
| 2001/0019777 A1 | 9/2001 | Tanaka et al. | 428/472.2 |
| 2002/0011510 A1 | 1/2002 | Enomoto | 228/112.1 |
| 2003/0031892 A1 | 2/2003 | Fujita et al. | 428/653 |
| 2003/0085257 A1 | 5/2003 | James et al. | 228/112.1 |
| 2003/0205479 A1 * | 11/2003 | Lin et al. | 205/153 |
| 2004/0072009 A1 * | 4/2004 | Segal et al. | 428/561 |

FOREIGN PATENT DOCUMENTS

| | | |
|---|---|---|
| EP | 0702098 | 8/1995 |
| EP | 0920948 | 6/1999 |
| EP | 1138793 | 3/2001 |
| JP | 11291068 | 10/1999 |
| JP | 2000288748 | 10/2000 |
| JP | 2001009577 | 1/2001 |
| JP | 2001071897 | 3/2001 |
| JP | 2001239376 | 9/2001 |

OTHER PUBLICATIONS

H. Kreye et al., " Microsructural Changes and Bonding Mechanism in Friction Welding", Zeitschrift fuer Metallkunde, vol. 68, pp. 253-259 (1977).

Z. Li et al., "Mechanical and Metallurgical Properties of MMC Friction Welds", Welding Journal, vol. 76, No. 9, pp. 367-373 (1997).

R. S. Mishra, "Processing commercial aluminum alloys for high strain rate superplasticity", Journal of the Minerals, Metals and Materials Society, vol. 53, No. 3, pp. 23-26 (2001).

Y. S. Sato et al., "Retention of fine grained microstructure of equal channel angular pressed aluminum alloy 1050 by friction stir welding", Scripta Materiala, vol. 45, No. 1, pp. 109-114 (2001).

"Aluminum Extrusion: Mechanical Properties of Alloy", from Hydro Aluminum Components website, www.aluminumcomponents.hydro.com.

K. Katoh et al., "Properties of 6061 aluminum alloy friction welded joints", Journal of Light Metal Welding & Construction, vol. 32, No. 5, pp. 863-868 (1994).

K. Kato et al., "Friction welding of Al2O3P/6061 aluminum alloy composite to 5052 aluminum alloy", Journal of Japan Friction Welding Association, vol. 3, No. 3, pp. 509-514 (1997).

T. Shinoda et al., "Friction welding phenomena of aluminum", Journal of Light Metal Welding & Construction, vol. 37, No. 8, pp. 425-430 (2000).

Copy of Search in corresponding PCT Application Ser. No. PCT/US03/04801, filed Feb. 13, 2003.

* cited by examiner

SEMICONDUCTOR PROCESSING APPARATUS INCLUDING PLASMA-RESISTANT, WELDED ALUMINUM STRUCTURES

This application is a continuation application of application Ser. No. 10/086,003, filed Feb. 26, 2002 now U.S. Pat. No. 6,659,331, which is currently pending.

BACKGROUND OF THE INVENTION

1. Field of the Invention

In general, the present invention relates to a method of fabrication of semiconductor processing apparatus from an aluminum substrate. In particular, the invention relates to a method of forming complex shapes which can subsequently be anodized to provide at least one plasma-resistant surface, and particularly a surface which is resistant to halogen-containing plasmas.

2. Brief Description of the Background Art

Semiconductor processing involves a number of different chemical and physical processes whereby minute integrated circuits are created on a substrate. Layers of materials which make up the integrated circuit are created by chemical vapor deposition, physical vapor deposition and epitaxial growth, for example. Some of the layers of material are patterned using photoresist masks and wet and dry etching techniques. Patterns are created within layers by the implantation of dopants at particular locations. The substrate upon which the integrated circuit is created may be silicon, gallium arsenide, glass, or any other appropriate material.

Many of the semiconductor processes used to produce integrated circuits employ halogen or halogen-containing gases or plasmas which are particularly corrosive to processing apparatus surfaces they contact. Some processes use halogen-containing liquids. In addition, since the processes used to create the integrated circuits leave contaminant deposits on the surfaces of the processing apparatus, such deposits are commonly removed using plasma cleaning techniques which employ at least one halogen-containing gas, which is also corrosive.

Aluminum has been widely used as a construction material for semiconductor fabrication equipment, at times because of its conductive properties, and generally because of ease in fabrication and availability at a reasonable price. However, aluminum is susceptible to reaction with halogens such as chlorine, fluorine, and bromine, to produce, for example, $AlCl_3$ (or $Al_2Cl_6$); or $AlF_3$; or $AlBr_3$ (or $Al_2Br_6$). The aluminum-fluorine compounds can flake off the surfaces of process apparatus parts, causing an eroding away of the parts themselves, and serving as a source of particulate contamination of the process chamber (and parts produced in the chamber). Most of the compounds containing aluminum and chlorine and many of the compounds containing aluminum and bromine are gaseous under semiconductor processing conditions and leave the aluminum structure, creating voids which render the structure unstable and with a surface having questionable integrity.

Porosity of the surface of aluminum semiconductor processing apparatus is of grave concern. We discovered that when a large block of aluminum alloy such as 6061 is machined out (hogged out) to produce a complex shape Such as a liner for a processing vessel, the machined surface exhibits a high degree of porosity. We considered extruding a tube, as a technique for obtaining an improved aluminum grain structure, and then joining the tube to a top plate to obtain a process chamber liner shape. However, then the problem shifts to joining of the tube to the top plate. Welding of the tube to the top plate typically creates impurities at the interface of materials coming together in the weld (at the joint of the weld), and the impurities frequently increase porosity at the weld joint. The impurities may be in the form of a filler material used in the welding process or may be in the form of impurities present in the aluminum alloy itself which migrate to the weld joint area during the welding process. Welding is generally defined as a coalescence of metals produced by heating to a suitable temperature with or without the application of pressure, and with or without the use of a filler material. Some of the more commonly used welding techniques include electron-beam welding, laser welding, and solid-phase welding. Solid phase welding processes include, for example, diffusion bonding, friction welding, and ultrasonic joining. Solid phase processes typically produce welds without melting the base material and without the addition of a filler material. Pressure is always employed, and generally some heat is provided. Furnace heating is generally provided in diffusion bonding while frictional heat is developed in ultrasonic and friction joining.

Welding typically produces stress both at the welding joint and in material adjacent the welding joint. Heat treatment or annealing is commonly used to relieve stress. Aluminum alloys begin to exhibit grain growth at temperatures approaching 345° C., which causes precipitation of non-aluminum metals at the grain boundaries. This precipitation may lead to cracking along a weld joint when the weld joint is mechanically loaded, and may lead to cracking along grain boundaries during machining. The precipitation also reduces mechanical properties of the alloy by affecting the uniformity of the alloy composition within the article.

If an aluminum alloy is to perform well in a number of semiconductor process apparatus applications, it should also have desirable mechanical properties. Further, mechanical properties should enable machining to provide an article having the desired final dimensions. For example, if the alloy is too soft, it is difficult to drill a hole, as material tends to stick during the drilling rather than to be removed by the drill. Controlling the dimensions of the machined article is more difficult. There is a penalty in machining cost. In addition, the mechanical properties of the article affect the ability of the article to perform under vacuum, depending on the function of the article. For example, a process chamber must exhibit sufficient structural rigidity and resistance to deformation that it can be properly sealed against high vacuum.

With respect to resistance to a halogen-containing plasma, a preferred means of protection of the aluminum surfaces within a process apparatus has been an anodized aluminum coating. Anodizing is typically an electrolytic oxidation process that produces an integral coating of relatively porous aluminum oxide on an aluminum surface. Despite the use of anodized aluminum protective layers, the lifetime of anodized aluminum parts in semiconductor processing apparatus has been limited, due to the gradual degradation of the protective anodized film. In addition, in the past, the combination of mechanical performance of the article and corrosion resistance of the surface of the article has not been adequately addressed. In attempting to obtain the mechanical properties required for the aluminum alloy body of an article, it is possible to affect the surface of the aluminum alloy in a manner such that the aluminum oxide (anodized) layer does not form a proper interface with the aluminum alloy. This creates a porosity, for example gaps between the aluminum oxide layer and the underlying aluminum surface. We have determined that it is particularly difficult to form a protective anodized coating over a weld joint. The porosity and impurities present at a conventional weld joint interfere with anodization of the aluminum present at the weld joint surface. This porosity promotes a breakdown in the protective aluminum oxide layer, leads to particle formation and a constantly accelerating degradation of the protective aluminum oxide film.

Not only is there significant expense in equipment maintenance and apparatus replacement costs due to degradation of the protective aluminum oxide film, but if a susceptor, for example, develops significant surface defects, these defects can translate through a silicon wafer atop the susceptor, creating device current leakage or even short. The loss of all the devices on a wafer can be at a cost as high as $50,000 to $60,000 or more.

It is readily apparent from the above discussion that there is a long standing need for a method of producing semiconductor apparatus components which have a complex shape (the component is not merely a flat plate, for example), which have adequate mechanical properties for the intended application, and which are protected by an anodized coating which is capable of withstanding a corrosive plasma environment.

SUMMARY OF THE INVENTION

We have discovered a method of producing a complex-shaped aluminum alloy article, where welding has been employed to form the article, when an anodized aluminum coating is produced over a surface of the article including a weld joint, and where the anodized aluminum coating provides improved performance over that previously known in the art, when exposed to a corrosive plasma environment.

The welding of elements of the aluminum alloy article to form a complex shape is carried out using frictional welding, or a similar technique which permits welding without the migration of a significant amount of impurities contained in the aluminum alloy toward the weld joint. A significant amount is intended to mean an amount which would significantly harm the subsequent formation of an anodized aluminum oxide protective coating over an aluminum alloy surface including the weld joint. Significant harm refers to the shortening of the performance lifetime of the anodized aluminum article. For example, prior to the present invention, the performance lifetime of an anodized welded aluminum article was shortened by about 80% compared to the lifetime of an anodized non-welded article.

In one embodiment, the particular aluminum alloy which is used to form the body of an article of apparatus may be forged, extruded or rolled, and should have the following composition by weight %. A magnesium content of about 0.1% to about 6.0%, with a mobile impurity atom content of less than 2.0%. Mobile impurity atoms include metal atoms other than magnesium, including transitional metals, semiconductors, and atoms which form semiconductor compounds. Mobile impurity atoms of particular interest include silicon, iron, copper, chromium, titanium and zinc. When the article of apparatus is to be used at operational temperatures which are greater than about 250° C., the magnesium content of the aluminum article should range between about 0.1% by weight and about 1.5% by weight of the article and the mobile impurity atom content should be less than about 0.2% by weight.

In a second embodiment, which has provided excellent results, which will be subsequently described in detail, a particular aluminum alloy is used to form the body of a semiconductor apparatus article. The raw aluminum alloy stock may be forged, extruded or rolled. The aluminum alloy should have the following composition (in addition to aluminum) by weight %: a magnesium concentration ranging from about 3.5% to about 4.0%, a silicon concentration ranging from 0% to about 0.03%, an iron concentration ranging from 0% to about 0.03%, a copper concentration ranging from about 0.02% to about 0.07%, a manganese concentration ranging from about 0.005% to about 0.015%, a zinc concentration ranging from about 0.08% to about 0.16%, a chromium concentration ranging from about 0.02% to about 0.07%, and a titanium concentration ranging from 0% to about 0.01%, with other single impurities not exceeding about 0.03% each and other total impurities not exceeding about 0.1%. In some instances, depending on what the impurities are, the other total impurities may be permitted to rise to about 0.2% by weight. In addition, the aluminum alloy is required to meet a particular specification with respect to particulates formed from mobile impurities. Of the particulate agglomerations of impurity compounds, at least 95% of all particles must be less than 5 µm in size. Five (5)% of the particles may range from 5 µm to 20 µm in size. Finally, no more than 0.1% of the particles may be larger than 20 µm, with no particles being larger than 40 µm. This high purity aluminum alloy is referred to as LP™ alloy hereafter. LP™ is a trademark of Applied Materials, Inc. of Santa Clara, Calif. In addition to the LP™ alloy, an alloy having the same chemical composition, but slightly different particle size distribution may also be used with good results. In this instance, the particle distribution is such that no more than 0.2% of the particles (and typically no more than 0.1% of the particles) range between 50 µm and 20 µm; or, no more than 0.2% of the particles range between 40 µm and 20 µm.

After welding of the elements of the aluminum alloy article to form a complex-shaped part, the aluminum alloy may optionally be stress relieved at a temperature of about 330° C. or less, prior to creation of the aluminum oxide protective film over the article surface. The end use application for the part determines whether stress relief is necessary. A side benefit of the heat treatment process is that it provides additional hardening of the alloy, despite prior art assertions to the contrary with respect to aluminum alloys. It is very important that when heat treatment is used, the heat treatment is carried out using lover peak temperatures than commonly recommended for aluminum alloys. Employment of a peak stress relief temperature of less than about 300° C. will ensure the desired material properties of the alloy with respect to grain structure, non-aluminum metal distribution properties, and mechanical properties in the article produced. By controlling the grain size of the aluminum alloy during stress relief, and the distribution of impurities within the alloy, it is possible to avoid or at least significantly reduce the formation of impurities near the surface of an alloy article, which impurities interfere with the formation of an anodized aluminum oxide coating on the surface of the article. This ensures the formation of a uniform anodized coating over the entire article surface, including any weld joints in the article. This method of stress relief works particularly well in combination with the LP™ alloy.

An anodized aluminum oxide protective film is typically applied using an electrolytic oxidation process. Generally, the article to be anodized is immersed as the anode in an acid electrolyte and a DC current is applied. On the surface, the aluminum alloy is electrochemically converted into a layer of aluminum oxide.

Prior to the anodization process, it is important to chemically clean and polish the aluminum alloy surface. The cleaning may be carried out using a method known to those skilled in the art. A particularly effective cleaning may be carried out by contacting the surface of the aluminum article with an acidic solution including about 60% to 90% technical grade phosphoric acid, having a specific gravity of about 1.7 and about 1%–3% by weight of nitric acid. The article temperature during cleaning is typically in the range of about 100° C., and the time period the surface of the article is in contact with the cleaning solution typically ranges from about 30 to about 120 seconds. Often, the cleaning process is followed by a deionized water rinse.

The subsequent anodization of the aluminum alloy surface to create an aluminum oxide surface may be carried out using anodization techniques known in the art. A particularly good anodized protective coating may be obtained electrolytically in a water-based solution comprising 10% to 20% by weight sulfuric acid and about 0.5% to 3.0% by weight oxalic acid. The anodizing temperature is typically set within a range from about 5° C. to about 25° C., and often within a range from about 7° C. to about 21° C. The article to be "anodized" serves as the anode, while an aluminum sheet of standard 6061 serves as the cathode. Generally, during the electrolytic oxidation process the current density, in Amps/Square Foot (ASF) in the electrolytic bath, ranges from about 5 ASF to less than 36 ASF. Further, the "barrier layer" thickness at the base of the aluminum oxide film may be controlled by the operating (anodization) voltage, which typically ranges from about 15 V to about 30 V.

BRIEF DESCRIPTION OF THE DRAWINGS

A better understanding of the invention is obtained when the following detailed description is considered in conjunction with the following drawings in which:

FIG. 1B illustrates an enlarged view of the structure shown in FIG. 1A at the area indicated. This shows the 4047 filler material boundary 109 with thin anodized coating 110 at the indicated location. This enlarged view shows better the particulates (impurity agglomerates) 112 which are present throughout the 4047 filler material 104, with some of the particulates 112 extending up through anodized coating 110 at locations 114.

DETAILED DESCRIPTION OF THE INVENTION

As a preface to the detailed description, it should be noted that, as used in this specification and the appended claims, the singular forms "a", "an", and "the" include plural referents, unless the context clearly dictates otherwise.

In the past, complex-shaped semiconductor processing apparatus parts and devices were generally fabricated by machining from a block of aluminum alloy. The huge ingots or blocks from which the apparatus parts were machined had inherent porosity. The porosity was evident on the machined surface of chamber liners and other components which were machined from the ingots, and the porous surface could not be reliably anodized. A poor anodized aluminum oxide protective layer on the surface of an apparatus part affected the corrosion resistance of the part upon exposure to a corrosive plasma. One source of aluminum alloy which had a controlled grain structure and which was superior in terms of porosity (relative to the ingot) was extruded stock, such as an extruded tube. Although it was desirable to use an extruded tube for the sidewalls of the liner, there was the problem of how to fasten a top plate with flange to the sidewalls. We welded an extruded tube to a flanged plate and formed an anodized coating over the exterior surface of the welded structure. The area of the liner in which the weld joint was present was difficult to anodize. We tried several different methods of welding, including laser welding, electron-beam welding, and TIG welding, for example, but not by way of limitation. Use of fusion welding techniques such as these results in heat affected areas and melting of filler, with cooling and recrystallization so that the microstructure in the area of the weld is different from the microstructure in the parent material. None of these welding methods enabled application of a satisfactory anodized coating over the area of the weld joint. To make matters worse, a semiconductor substrate tends to be positioned toward the top of a plasma processing chamber, so that the welded area of a chamber liner is exposed to the highest density plasma. As a result, it is this portion of the liner where the anodized coating needs to be particularly corrosion resistant.

Figure 1A:
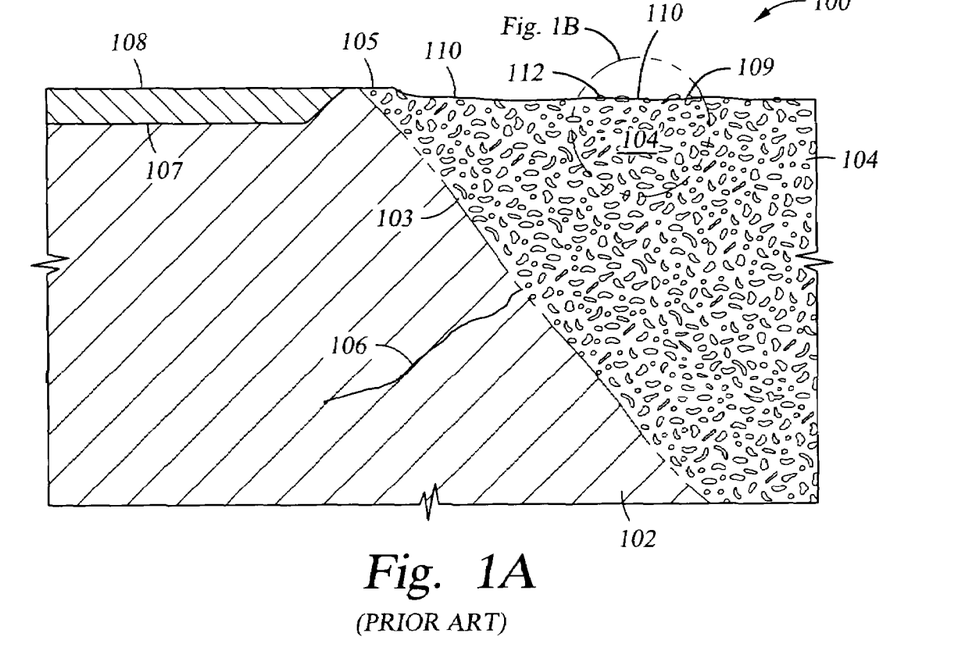
FIG. 1A illustrates a schematic cross-sectional Scanning Electron Microscope view of an electron beam welded structure 100, where LP™ aluminum alloy 102 is welded using a 4047 aluminum-containing filler material 104. One section of the weld 103 exhibited cracking 106. An anodized coating is present on the upper surface of the welded structure 100. The anodized coating 108 present on the LP™ alloy 102 boundary 107 is relatively thick. The anodized coating 110 present at the boundary 105 with weld joint interface 103, and at the boundary 109 with 4047 filler material 104 is relatively thin, with impurity particulates 112 present at and, in some instances, extending through anodized coating 110.
Figure 1B:
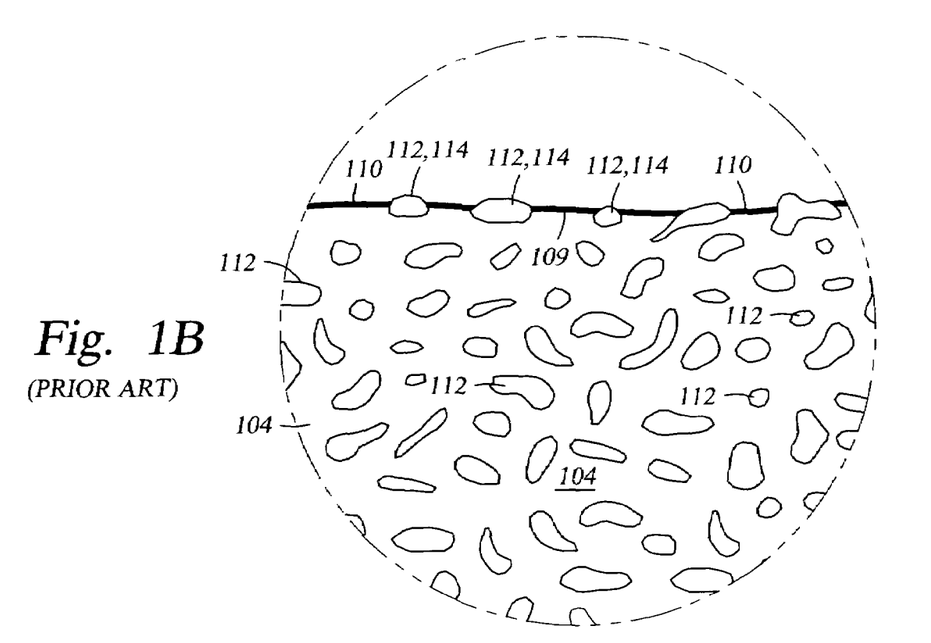

FIG. 1A illustrates a schematic cross-sectional SEM view of a typical electron-beam-welded structure 100, where LP™ aluminum alloy 102 is welded using 4047 filler material 104. One section of the weld 103 exhibited cracking 106. An anodized coating was formed on the upper surface of the welded structure 100. The anodized coating 108 present at the boundary 107 with LP™ alloy 102 was relatively thick, and would be expected to provide adequate protection for underlying LP™ alloy 102 when the surface 107 of coating 108 is exposed to a corrosive plasma. However, the anodized coating 110 formed at boundary 105 in the area of weld interface 103 and at boundary 109 in the area of 4047 aluminum-based filler material 104 was particularly thin, indicating questionable performance when exposed to the corrosive plasma. In addition, a close inspection of the anodized coating 110 formed at boundary 109 over the 4047 aluminum alloy 104 showed, as illustrated in FIG. 1B, that impurity particulates 112 were present in large numbers near boundary 109 and extended through anodized coating 110 in some instances 114.

Based on our observations regarding welding processes which involved the use of filler materials during weld formation, or which involved diffusion processes where the aluminum alloy must be at or near melt condition, we concluded that the surfaces presented in the welded part were not conducive to the formation of a reliable anodized coating.

There are some high purity aluminum alloys known in the art which were useful in providing corrosion resistance with respect to halogen-containing plasma. These alloys are described in U.S. Pat. No. 5,756,222 to Bercaw et al., issued May 26, 1998, and titled: "Corrosion-Resistant Aluminum Article For Semiconductor Processing Equipment". This reference discloses an article of manufacture useful in semiconductor processing which includes a body formed from a high purity aluminum-magnesium alloy having a magnesium content of about 0.1% to about 1.5% by weight, either throughout the entire article or at least in the surface region which is to be rendered corrosion-resistant, and a mobile impurity atom content of less than 0.2% by weight. Mobile impurity atoms are defined as consisting of metal atoms other than magnesium, transitional metals, semiconductors, and atoms which form semiconductor compounds. Mobile impurity atoms particularly named include silicon, iron, copper, chromium and zinc. The high purity aluminum-magnesium alloy may be overlaid by a protective film which is resistant to abrasion, such as an aluminum oxide or aluminum nitride film. The subject matter disclosed in this patent is hereby incorporated by reference in its entirety.

U.S. Pat. No. 5,811,195 to Bercaw et al., issued Sep. 22, 1998, and titled: "Corrosion-Resistant Aluminum Article For Semiconductor Equipment", further discloses that the magnesium content of the aluminum article may be in the range of about 0.1% to about 6.0% by weight of the aluminum article. However, for operational temperatures of the article which are greater than about 250° C., the magnesium content of the aluminum article should range between about 0.1% by weight and about 1.5% by weight of the article. In addition, an article is described in which the mobile impurities other than magnesium may be as high as about 2.0% by weight in particular instances. One instance is when there is a film overlying the exterior region of the article body, where the film comprises aluminum oxide or aluminum. Another instance is where there is a magnesium halide layer having a thickness of at least about 0.0025 microns over the exterior surface of the aluminum article. The subject matter disclosed in this patent is hereby incorporated by reference in its entirety.

Cabot Corporation, along with other corporations have offered a high purity aluminum alloy designated C276 for general sale for more than 10 years. This high purity aluminum alloy chemical composition may be useful in the present invention. However, the specification for the C276 alloy includes a particulate size and distribution limitation with respect to impurity compounds and agglomerations which may present problems regarding anodization of the alloy surface.

The Bercaw et al. patents previously mentioned are assigned to the assignee of the present invention, and additional work had been done regarding high purity aluminum alloys subsequent to the discoveries made by Bercaw et al. In particular, a new high purity aluminum alloy meeting particular requirements for impurity atoms and for particulate size ranges of accumulations or agglomerates of impurity atoms and compounds thereof has subsequently been developed. The new aluminum alloy LP™ composition is described in U.S. patent application, Ser. No. 10/071,869, filed Feb. 8, 2002, and assigned to the assignee of the present invention. The content of that application is hereby incorporated by reference in its entirety. The LP™ alloy includes impurities in the following ranges by weight %: magnesium at a concentration ranging from about 3.5% to about 4.0%, silicon at a concentration ranging from 0% to about 0.03%, iron at a concentration ranging from 0% to about 0.03%, copper at a concentration ranging from about 0.02% to about 0.07%, manganese at a concentration ranging from about 0.005% to about 0.015%, zinc at a concentration ranging from about 0.08% to about 0.16%, chromium at a concentration ranging from about 0.02% to about 0.07%, and titanium at a concentration ranging from 0% to about 0.010%, with other single impurities not exceeding about 0.03% each and other total impurities not exceeding about 0.1%. The alloy composition measurement was made by Sparking method for GDMS or by Molten method for GDMS.

In addition to the compositional limitations, applicants required the following additional specifications with respect to the LP™ aluminum alloy. Of the particulate agglomerations of impurity compounds, at least 95% of all particles must be less than 5 μm in size. Five (5)% of the particles may be larger than 5 μm but less than 20 μm in maximum dimension. Finally, no more than 0.1% of the particles may be larger than 20 μm, with no particles being larger than 40 μm. The analysis technique used to determine particle size and size distribution was based on back scattered image analysis under the scanning electron microscope (SEM). The magnification was at 500× in order to assess the constituent particles. The area of each image was about 150 μm×200 μm. The digital resolution was at least 0.2 μm/pixel. At least 40 images were taken at random from a sample area of 0.75 inch diameter in order to obtain good assessment of various areas on the metal microstructure, to ensure meaningful statistical analysis. The back scattered images were digitally stored to provide for statistical analysis. The images were transferred to an image analyzer and the distribution of the particles with a mean atomic number higher than that of Al (white in the images) were detected and measured. The digital resolution allowed for measurement of particles as small as 0.2 μm. The image analyzer used was IBAS by Zeiss. Particle agglomerates were seen as precipitated particles. The parameters to determine the particle's size distribution were: the diameter of the area equal circle $\phi=2\times$ square root of $(A/\pi)$, where A is the area of a particle. The class limits were as follows: 0.2; 1; 2; 4; 5; 20; 40. The number of particles in each class was determined and then normalized to 100% for the total number of particles measured.

The high purity LP™ aluminum alloy is expensive relative to standard aluminum alloys, making it important to conserve material. In addition, the machining cost of hogging out a solid ingot of material is high due to the amount of machining time required, and the equipment and programmed machining instructions have to be reformulated for each different complex apparatus shape. We considered the use of an extruded tube to obtain near net shape dimensions for the sidewalls of a chamber liner to be very attractive, saving in both materials cost and machining cost. However, the problem of how to weld the tube to a top plate with flange to form a chamber liner still remained.

To avoid the potential for particulate formation due to the agglomeration of mobile impurities in the area of the weld, we wanted to avoid a welding process which involved the use of a filler material which would be a source of impurities. We also wanted to avoid the use of a welding process which required the melting or near melting of the alloy to be welded, which permits impurities to migrate, agglomerate, and move toward the surface of the article being welded. We selected friction welding as the welding process offering the best potential for achieving our goals.

The new problem became how to friction weld a large surface area of the kind required for a chamber liner, where the surface area to be welded was in the range of about 45 square inches (290 cm²). We were unable to find a friction welding machine which was capable of handling such a large surface area. We had to empirically develop a frictional welding process which could be used to weld LP™ alloy structures of the size required for process chamber liners and other large structures needed for various semiconductor apparatus applications.

EXAMPLES

Example One

For purposes of illustration, and not by way of limitation, the invention will be described with respect to a method of producing a plasma process chamber liner of the kind used by assignee Applied Materials, Inc. in a number of different semiconductor processing systems. For reference purposes, one skilled in the art may find it helpful to refer to product information for the Applied Materials, Inc. e-Max™ chamber liner, e-Max™ cathode liner, and for the MXP⁺™ chamber liner for examples of apparatus which have been fabricated by us during the development of the invention. The size of these process apparatus elements requires a weld surface area of 45 in², 35 in², and 45 in², respectively.

The e-Max™ process chamber is used in the plasma etching of structures on semiconductor substrates. Plasma etching is frequently done using halogen-containing plasmas which are particularly corrosive. In view of the information we developed with respect to the properties of various aluminum alloys, it was decided to fabricate a prototype LP™ aluminum alloy chamber liner. The liner component was fabricated from a flat plate flange joined to a cylindrical body. The cylindrical body was formed as an extruded tube of the LP™ alloy. The problem was to join the two elements to form the complex-shaped chamber liner component. After considerable investigation, we determined that Manufacturing Technology Incorporated (MTI) of South Bend, Ind. was the sole U.S. domestic fabricator of friction and inertia welders with machine capability to accommodate e-Max 200 mm liner components. The descriptions in this example pertain to a prototype chamber liner fabricated on friction welding tools available from this manufacturer.

The prototype LP™ alloy flange components were machined from plate stock and the cylindrical liner bodies were from extruded tube stock of the same material. Flange and liner bodies were inertia welded at MTI under our direction, to validate an acceptable friction welding process, while establishing weld quality as a function of joining parameters.

Figures 2A, 2B, 2C, 2D, 2E:
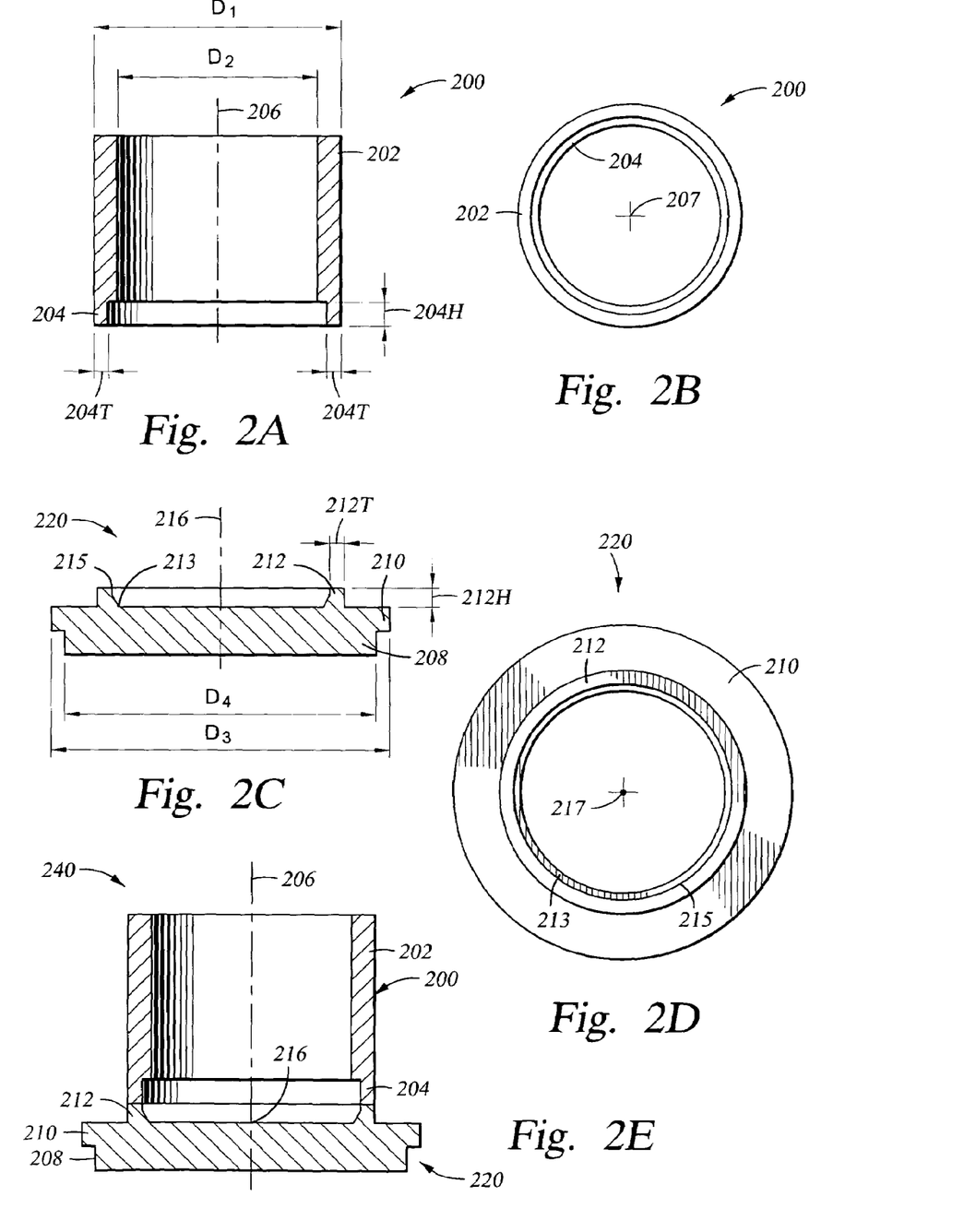
FIG. 2A shows a schematic cross-sectional view of a preform chamber liner body section 200 having sidewalls 202 and a welding extension 204. The liner body section is in the form of an extruded tube of LP™ aluminum alloy, where the centerline of the tube is marked 206.
FIG. 2B shows a schematic top view of the preform chamber liner body section 200 of FIG. 2A, where 207 represents the center-line.
FIG. 2C shows a schematic cross-sectional view of a preform top plate with flange 220 which is to be friction welded to preform chamber liner body section 200. Top plate with flange 220 includes a base 208, a flange 210, a lip 212, and a centerline 216.
FIG. 2D is a schematic top view of the top plate with flange 220 of FIG. 2C, where 217 represents the centerline.
FIG. 2E shows a schematic cross-sectional view of the combined extruded tube structure 200 and the top plate with flange 220 as they are lined up prior to friction welding, where centerline 206 of extruded tube structure 200 is lined up with centerline 216 of top plate with flange 220. It is the welding extension 204 of extruded tube structure 200 and the welding extension 212 of top plate with flange 220 which will be sacrificed, at least in part, during the frictional welding process and which will be squeezed out as flash to provide a clean fresh surface at the weld interface (not shown).

With reference to FIG. 2A, this schematic cross-section illustrates a preform chamber liner body section 200 having sidewalls 202 and a welding extension 204. The thickness 204 T of welding extension 204 as approximately 1.05 inches (26.7 mm) and the height (length) 204H was about 1.5 inches (38 mm). The exterior diameter D1 of the liner body section was about 14.65 inches (372 mm), and the interior diameter D2 of the liner body section (other than welding extension 204) was about 11.45 inches (290 mm). Parallelism of the liner body section was within 0.010 inch (0.25 mm), and concentricity was within 0.008 inch (0.20 mm). FIG. 2B is a top view of the preform chamber liner body section 200, where 207 represents the center-line which is shown as 206 on FIG. 2A.

With reference to FIG. 2C, this schematic cross-section illustrates a preform chamber liner top plate with flange 220 which is to be friction welded to preform chamber liner body section 200. Chamber liner top plate with flange 220 includes a base 208 having an exterior diameter D3 of about 18.5 inches (470 mm), a flange 210 having an exterior diameter of about 20.0 inches (508 mm), and a welding extension 212, where the thickness 212T of the extension 212 at its end was about 1.05 inches (26.7 mm), and the height (length) 212H was about 1.12 inches (28 mm). Parallelism of the top plate section was within 0.005 inch (0.13 mm). Concentricity was within 0.008 inch (0.20 mm).

FIG. 2D is a top view of the preform chamber liner top plate with flange 220, where 217 represents the centerline which is shown as 216 on FIG. 2C.

FIG. 2E shows an assembly of the preform chamber liner body section 200 and the preform chamber liner top plate with flange 220 prior to friction welding.

The friction (inertia) welding process was carried out on MTI's 450-ton inertia welding machine, which is comprised of a rotating headstock and a non-rotating tailstock. The desired weld energy was obtained by driving an inertial mass fixed to the headstock to a specified rotational velocity. A PLC controller managed all machine functions as programmed to our specifications. The tailstock is programmed to move axially and is initially positioned to achieve a 0.1 inch gap between the two components to be welded. On weld cycle initiation, the headstock is accelerated to the desired RPM, and the drive unit is disengaged. Following a preprogrammed linear motion and axial force schedule, the tailstock is advanced, causing the two components to make contact, generate frictional heating and ultimately weld. As in most plastic deformation welding processes, melting does not occur. Localized heat generation results in material property reduction and subsequent metal flow as upset force is applied. Heat affected material from the initial mating surfaces, along with oxides and contaminants are expelled in the flash. For purposes of reference in the description which follows, the following definitions apply. Flash or weld flash typically refers to the material extruded from the weld interface due to the application of axial upset force. Flash will occur on both the outside diameter (O.D.) and the inside diameter (I.D.) of the assemblies in the weld area. Weld upset typically refers to the difference in length between the welded and unwelded components. Upset results from the plastic displacement of material at the weld interface, and is dependent on weld energy, rotation velocity, and upset load. Faying surface typically refers to the contacting surface of each of the two member which are to be joined. Upset force typically refers to the axial force applied at the faying surface to produce friction and upset displacement. Joint efficiency typically refers to the ratio of the strength of a joint to the strength of the base metal (expressed in percent).

Figure 3A:
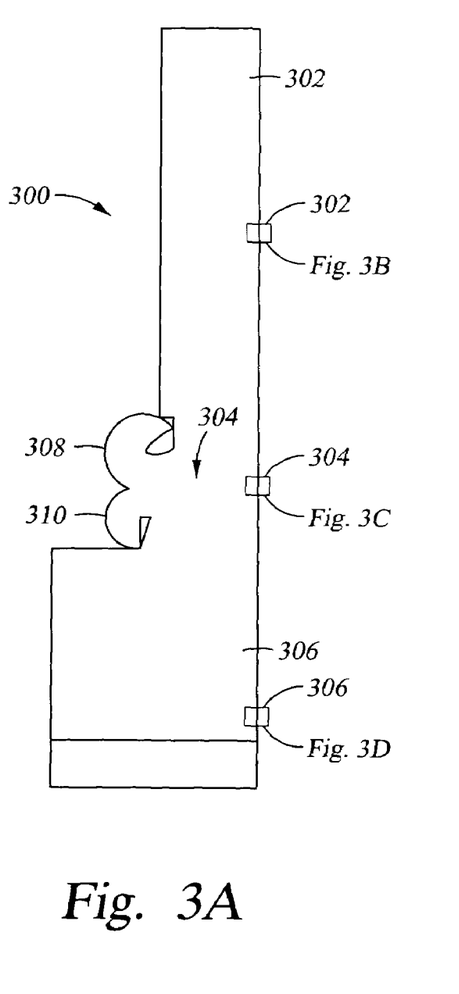
FIG. 3A illustrates a cross section of a test coupon 300 taken from a friction welded process vessel liner (not shown in its entirety). The alloy used to fabricate the liner was LP™. The chamber body liner (extruded tube) structure 302 was friction welded to top plate with flange 306 (machined from a flat plate extruded stock), with the weld line being in the area 304.

With reference to "flash", for example, FIG. 3A shows a coupon cut from a welded liner chamber body 300, where the chamber liner body section 302 and the chamber liner top plate and flange 306 are welded together in the area 304, with flash 308 exiting from chamber body 300 and flash 310 exiting from top plate and flange 306.

A preform chamber liner top plate with flange 220 was fabricated from LP™ alloy plate measuring 4 inches thick by about 20 inches in diameter. One side of the plate was machined to produce the 1.5 inch high welding extension 212, per our specification based on calculations particularly applicable to the LP™ alloy physical properties. The mating welding extension 204 on the extruded preform of the chamber liner body section 200 as machined flat and parallel to respective tolerances of 0.010 inch. The first series of welding experiments included five part sets of the e-Max™ prototype chamber liners.

All of the five prototype chamber liners, fabricated from LP™ aluminum alloy, were welded by chucking the top plate with flange 220 in the rotating headstock and the cylindrical liner body section 200 in the non-rotating tailstock. Based on initial calculations and earlier experiments, we had estimated that for joining a faying surface area of about 45 in$^2$ of LP™ aluminum alloy to form a "butt" joint between a chamber body liner and a top plate with flange, the spindle velocity for welding should range from about 350 RPM to about 750 RPM; the upset load should range from about 3,000 psi to about 4,000 psi; the total weld energy should range from about 1,000 ft-lbs to about 3,500 ft-lbs; and the upset should be about 0.9 inches to about 1.25 inches. The first prototype chamber liner welding was carried out where the wall thickness of the welding extensions was about 1.05 inches (26.7 mm), the weld area was about 45 in$^2$, the RPM of the rotating headstock was 483, and the Up-set Pressure was 3,730 psi. The welding appeared to meet all requirements, except that, due to equipment holding support difficulties, the upset was about 1.67 inches, and the chamber liner body section 200 was flared where it joined the top plate with flange 220. In view of the results, the other four prototype chamber liners were fabricated under the same operating conditions, but with improved holding support for the liner body section 200. The upset in inches for the following four prototype chamber liners varied from about 0.99 to about 1.08 inches.

The general metallography requirements for an acceptable welded part were as follows: Examination of a section taken through the weld zone, using standard metallographic practices, must be uniform across the smallest part joined, with examination in accordance with ASTM-E2, ASTM-E112, or AWS-B1.1.

Figure 3B:
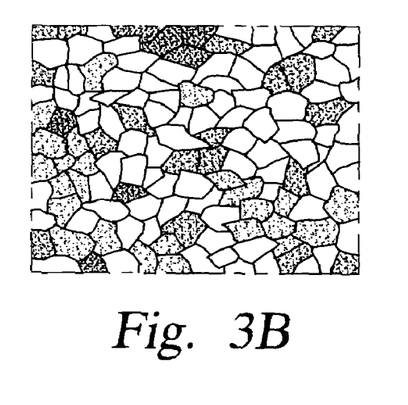
FIG. 3B illustrates the microstructure 302m of the aluminum grains in the chamber body liner (extruded tube) structure 302, which aluminum grains were undisturbed by the welding process.
Figure 3C:
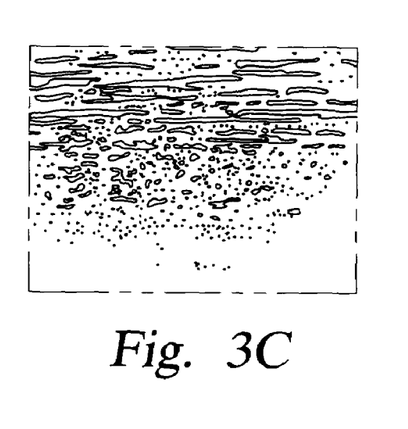
FIG. 3C illustrates the microstructure 304m of the aluminum grains in the area of the frictional weld 304.
Figure 3D:
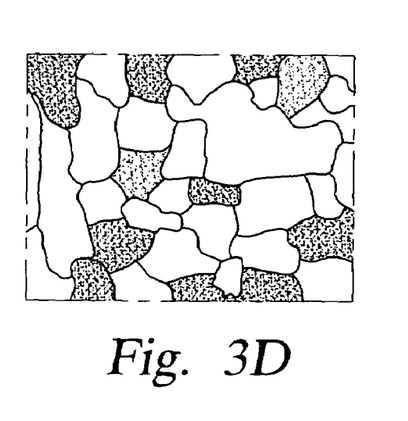
FIG. 3D illustrates the microstructure 306m of the aluminum grains in the top plate with flange 306, which aluminum grains were undisturbed by the welding process.

With reference to FIGS. 3A through 3D, as discussed above, FIG. 3A shows a coupon cut from a welded liner chamber body 300, where the chamber liner body section 302 and the chamber liner top plate and flange 306 are welded together in the area 304, with flash 308 exiting from liner chamber body 300 and flash 310 exiting from top plate and flange 306. FIG. 3B shows an SEM illustration of the aluminum grain structure (microstructure) for the extruded tube of LP™ alloy which was used to fabricate the liner chamber body section 302. The magnification in FIG. 3B is about 50×. It is readily apparent in FIG. 3B that the grain size of grains 322 is generally uniform. FIG. 3C shows an SEM of the aluminum grain structure for the weld zone area 304. The magnification in FIG. 3C is about 50×. Clearly the grain size in the weld zone has been decreased substantially. FIG. 3D shows an SEM illustration of the aluminum grain structure for the parent plate stock of LP™ alloy which was used to fabricate the top plate and flange section 306. The magnification in FIG. 3D is about 50×. The grain size in the top plate and flange 306 machined from the parent plate stock is also uniform.

Example Two

Figure 6:
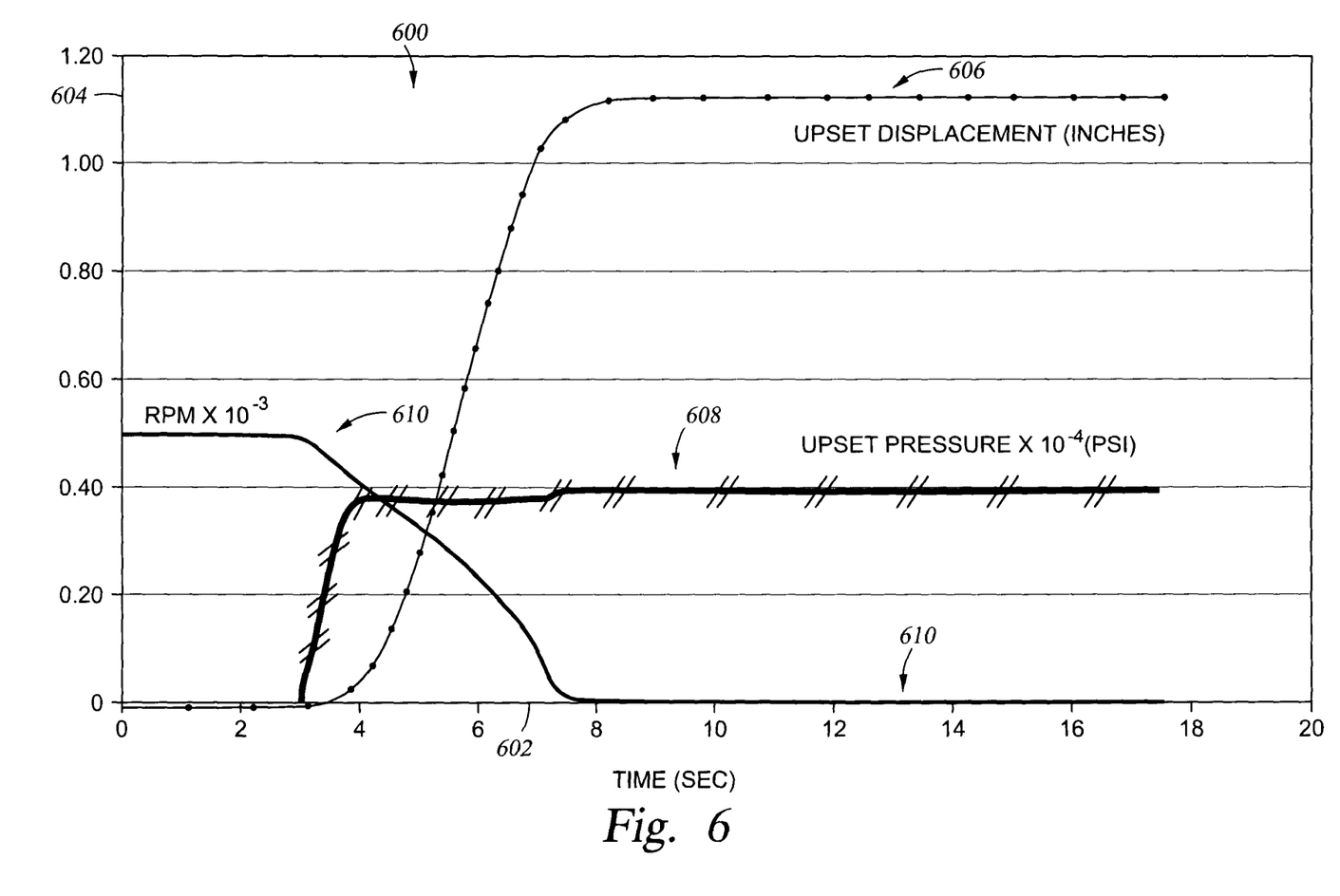
FIG. 6 shows welding process variables as a function of time for the welding of a prototype chamber liner which exhibited excellent welding results.

In another set of experiments two additional prototype LP™ alloy chamber liners were prepared in much the same manner as described above. With respect to Prototype No. 1, during the welding operation, the spindle RPM was about 500, the upset was 1.160 inch, and the upset force was about 4,000 lbs. FIG. 6 is a graph 600 showing process variables as a function of time during the welding operation. In particular, axis 604 shows a nominal value, while axis 602 shows time in seconds. Curve 610 shows the spindle RPM, where the number on the nominal value axis 604 is equal to the spindle RPM×10$^{-3}$; i.e., the number on the nominal value axis 604 must be multiplied by 10$^3$ to obtain the RPM. Curve 608 shows the upset pressure, where tile number on the nominal value axis 604 is equal to the upset pressure in psi×10$^{-4}$; i.e., the number on the nominal value axis 604 must be multiplied by 10$^4$ to obtain the upset pressure in psi. Curve 610 shows the upset displacement in inches.

Figure 7:
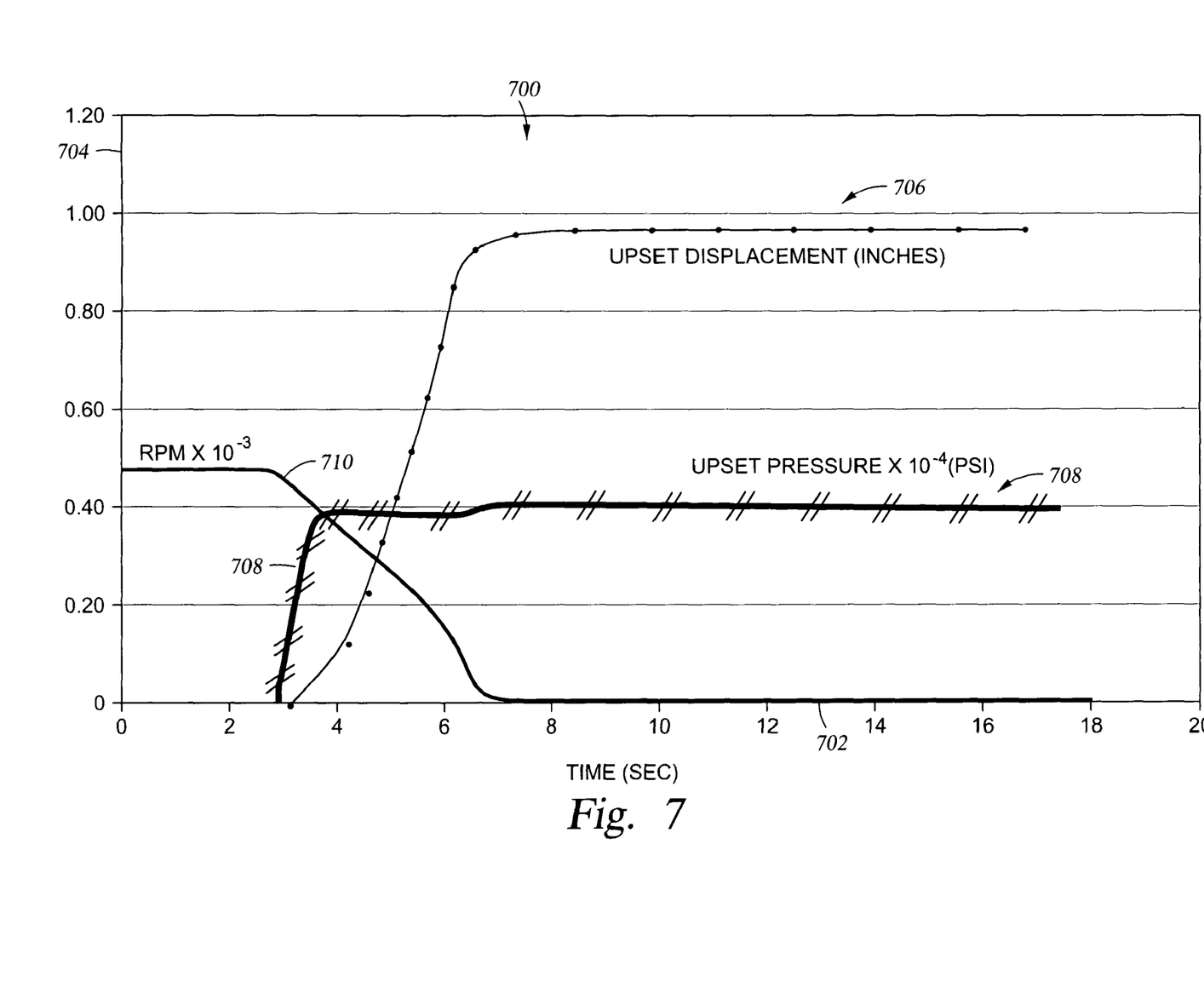
FIG. 7 shows welding process variables as a function of time for the welding of another prototype chamber liner which exhibited excellent welding results.

With respect to Prototype No. 2, during the welding operation, the spindle RPM was 470, the upset was 1.004 inch, and the upset force was about 4,000 lbs. FIG. 7 is a graph 700 showing process variables as a function of time during the welding operation. In particular, axis 704 shows a nominal value, while axis 702 shows time in seconds. Curve 710 shows the spindle RPM×10$^{-3}$; i.e. the number on the nominal value axis 704 must be multiplied by 10$^3$ to obtain the RPM. Curve 708 shows the upset pressure×10$^{-4}$; i.e., the number on the nominal value axis 704 must be multiplied by 10$^4$ to obtain the upset pressure in psi. Curve 706 shows the upset displacement in inches.

The weld lines between the chamber liner body and the top plate with flange were barely discemable, even after exposure to an acidic etch solution. Electro chemical etching was employed to resolve the grain structure in the area of the weld, and the grain structure appearance was very similar to that shown in FIG. 3C. The weld line was denoted by a band of very fine grains, the result of dynamic recrystallization.

A hardness survey was made for each prototype. In the case of Prototype No. 1, the hardness was measured starting at the weld line and progressing at ⅛ inch intervals in the direction of the top plate and flange material. In the case of Prototype No. 2, the hardness was measured starting at the weld line and progressing at ⅛ inch intervals in the direction of the extruded liner chamber body section. Table 1 below shows the results of the micro hardness survey.

TABLE 1

| Location = weld line + ⅛ inch × number | Prototype No. 1 H$_k$ (Knoop hardness) | Prototype No. 2 H$_k$ (Knoop hardness) |
| --- | --- | --- |
| 0 | 88.2 | 78.5 |
| 1 | 88.2 | 75.2 |
| 2 | 82.0 | 75.3 |
| 3 | 85.5 | 75.4 |
| 4 | 85.5 | 75.3 |
| 5 | 81.8 | 75.1 |
| 6 | 77.0 | 75.0 |

It is readily apparent that the amount of inertial energy applied during welding minimally affects the hardness of the LP™ alloy in the area of the weld joint, with the hardness decreasing as the distance from the weld joint increases. In the case of the top plate material, it appears to take about ¾ inch for the hardness to approach that of the parent material. In the case of the extruded liner chamber body material, the hardness in the weld joint approaches that of the parent material within about the first ⅛ inch of travel away from the weld joint. In general, Table 1 shows that the work hardening at the weld interface is minimal.

Figures 4, 5B:
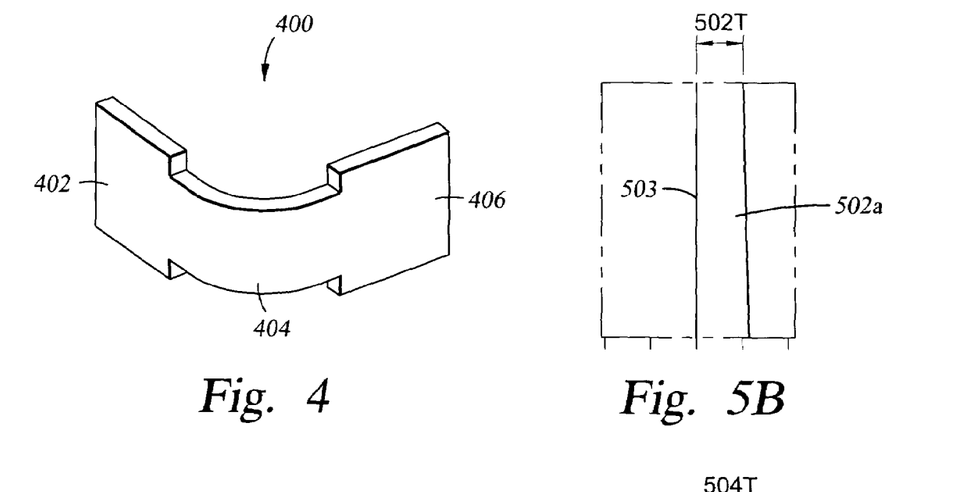
FIG. 4 illustrates a test coupon 400 taken from the friction welded liner described with reference to FIGS. 3A through 3D. The test coupon was machined for bending and consisted of "dog ears" 402 and 406. Bending was carried out with friction welded joint 404 at the center of the bend.
FIG. 5B illustrates the thickness of anodized coating 502a over exterior surface (boundary) 503 of chamber body liner structure 502.

In addition to evaluating the microstructure of the welded structure and the hardness of the LP™ alloy in the area of the weld joint, we also tested the elasticity of the weld as a means of testing the strength of the weld. FIG. 4 shows an example test specimen prepared from a welded prototype liner which was welded in accordance with the process conditions provided above with respect to Prototype No. 2, after the specimen was subjected to a bend test in accordance with ASTM method E-290. Specimen "dog ear" 406 contains extruded chamber liner body material, while "dog ear" 402 contains top plate and flange material. The weld joint 404 showed no signs of cracking or void formation for bend angles as high as 90 degrees, when the bend radius=1 inch and the test specicmen thickness is about 0.3 inches.

To make the welded prototype liners plasma resistant, particularly to halogen-containing plasmas, it is necessary to apply a protective coating which prevents abrasion of the liner surface as well as providing other beneficial functions. The surface of the liner to which the coating is to be applied is generally cleaned prior to application of the coating. The cleaning method may be one known in the art. A particularly effective cleaning may be carried out by contacting the surface of the aluminum article with an acidic solution including about 60% to 90% technical grade phosphoric acid, having a specific gravity of about 1.7 and about 1%–3% by weight of nitric acid. The article temperature during cleaning is typically in the range of about 100° C., and the time period the surface of the article is in contact with the cleaning solution typically ranges from about 30 to about 120 seconds. If the cleaning time is too short, contaminants may remain on the article surface. If the cleaning time is too long, additional porosity may be created on the alloy surface and the interface formed between the alloy surface and the anodized film layer may degrade more rapidly during the process lifetime of the article. Often, the cleaning process is followed by a deionized water rinse, using a number of different methods known in the art.

An excellent coating which is compatible with the aluminum alloy surface is an electrochemically applied aluminum oxide protective film. This protective film may be applied using any one of a number of methods known in the art. For example, Miyashita et al., in U.S. Pat. No. 5,039,388, issued Aug. 13, 1991, describe a plasma forming electrode used in pairs in a semiconductor processing chamber. The electrode is formed from a high purity aluminum or an aluminum alloy having a chromic acid anodic film on the electrode surface. The chromic acid anodized surface is said to greatly improve durability when used in a plasma treatment process in the presence of fluorine-containing gas. The electrode is described as formed from a high purity aluminum such as JIS 1050, 1100, 3003, 5052, 5053, and 6061 or similar alloys such as Al—Mg alloys containing 2 to 6% by weight magnesium.

We used an internally developed method of electrochemically applying an aluminum oxide protective film. The prototype chamber liner was immersed as the anode in an electrolyte bath comprised of a water-based solution including 10% to 20% in a water-based solution comprising 10% to 20% by weight sulfuric acid and about 0.5% to 3.0% by weight oxalic acid. The anodizing temperature is typically set within a range from about 5° C. to about 25° C., and often within a range from about 7° C. to about 21° C. The article to be "anodized" serves as the anode, while an aluminum sheet of standard 6061 serves as the cathode. Generally, during the electrolytic oxidation process the current density, in Amps/Square Foot (ASF) in the electrolytic bath, ranges from about 5 ASF to less than 36 ASF. Further, the "barrier layer" thickness at the base of the aluminum oxide film may be controlled by the operating (anodization) voltage, which typically ranges from about 15 V to about 30 V.

Figure 5A:
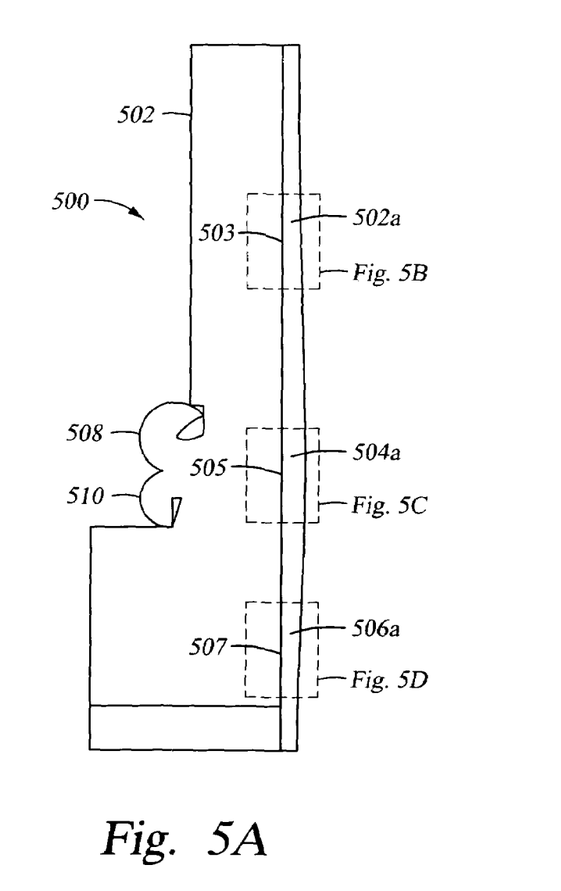
FIG. 5A illustrates a cross section of a test coupon 500 taken from the same friction welded process chamber liner as that discussed with reference to FIG. 3A, after cleaning and application of an anodized aluminum oxide protective film.
Figure 5C:
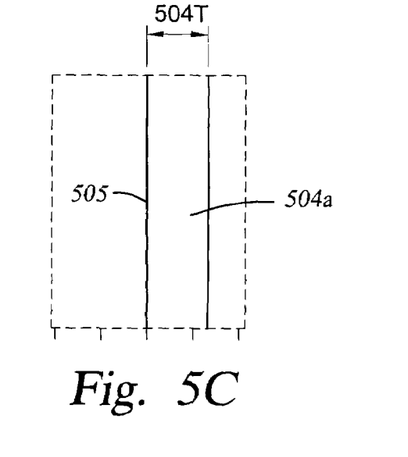
FIG. 5C illustrates the thickness of anodized coating 504a over the exterior surface (boundary) 505 of weld joint area 504.
Figure 5D:
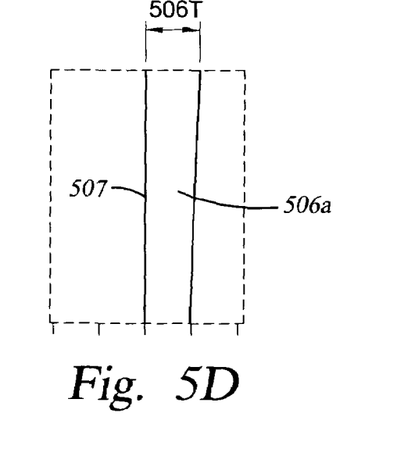
FIG. 5D illustrates the thickness of anodized coating 506a over the exterior surface (boundary) 507 of top plate with flange 506.

FIG. 5A illustrates a cross section of a test coupon 500 taken from the same friction welded process chamber liner as that discussed with reference to FIG. 3A, after cleaning and anodization of the process chamber liner. The chamber body liner (extruded tube) structure 502 was friction welded to top plate with flange 506, with the weld line being in the area 504, and with flash 508 being the residue from a welding extension (not shown) on chamber body liner structure 502, which welding extension was consumed during the frictional welding process. Flash 510 is the residue from a welding extension (not shown) on the top plate with flange 506, which welding extension was consumed during the frictional welding process. An anodized coating 502a was formed over the exterior surface 503 of chamber body liner structure 502; anodized coating 504a was formed over the exterior surface 505 of weld joint area 504; and anodized coating 506a was formed over the exterior surface 507 of top plate with flange 506. FIG. 5B illustrates the thickness of anodized coating 502*a* over exterior surface 503 of the chamber body liner (extruded tube) structure 502, where the average thickness 502T of the anodized coating was about 1.6 mils (0.0016 inch) (0.041 mm). FIG. 5C illustrates the thickness of anodized coating 504*a* over the exterior surface 505 of weld joint area 504, where the average thickness 504T of the anodized coating increased slightly to about 1.7 mils (0.043 mm). FIG. 5D illustrates the thickness of anodized coating 506*a* over the exterior surface 507 of top plate with flange 506, where the average thickness 506T of the anodized coating was about 1.6 mils (0.041 mm). Not only was the anodized coating consistently reliable across the weld joint and areas adjacent to the weld, but the coating was unexpectedly thicker over the weld joint than over the exterior surface 507 of top plate with flange 506. These coating thicknesses have not yet been optimized for the end use application, but are merely indicative of the uniformity of anodized coating which can be achieved when the method of the present invention is used to produce a complex-shaped welded part with an anodized coating applied over at least a portion of the part including a welded area.

The above described exemplary embodiments are not intended to limit the scope of the present invention, as one skilled in the art can, in view of the present disclosure, expand such embodiments to correspond with the subject matter of the invention claimed below.

We claim:

1. A semiconductor processing apparatus comprising a complex-shaped aluminum article, wherein a frictional welded area is present in said aluminum article, wherein no more than 0.2% of particles in the weld joint of said aluminum article have a calculated effective diameter ranging between 50 μm and 20 μm, with the calculated effective diameter of all other particles being smaller, whereby the effective diameter particle size in the weld joint is no larger than the effective diameter particle size in non-welded areas of the aluminum article, and wherein said aluminum article includes magnesium ranging from about 0.1% to about 6.0% by weight, with other impurities selected from the group consisting of silicon, iron, copper, chromium, titanium, and zinc totaling less than 2.0% by weight.

2. A semiconductor processing apparatus in accordance with claim 1, wherein said magnesium content ranges from about 0.1% to about 1.5% by weight.

3. A semiconductor processing apparatus comprising a complex-shaped aluminum article, wherein a frictional welded area is present in said aluminum article, wherein no more than 0.2% of particles in the weld joint of said aluminum article have a calculated effective diameter ranging between 50 μm and 20 μm, with the calculated effective diameter of all other particles being smaller, whereby the effective diameter particle size in the weld joint is no larger than the effective diameter particle size in the non-welded areas of the aluminum article, and wherein a variation in hardness between a weld line and a welded parent material is less than about 15%.

4. A semiconductor processing apparatus comprising a complex-shaped aluminum article having a frictional welded area, wherein at least a portion of said welded area has an aluminum oxide coating formed thereover, and wherein no more than 0.2% of particles in said aluminum article have a calculated effective diameter ranging between 50 μm and 20 μm, with the calculated effective diameter of all other particles being smaller, and wherein said aluminum article includes magnesium ranging from about 0.1% to about 6.0% by weight, with other impurities selected from the group consisting of silicon, iron, copper, chromium, titanium, and zinc totaling less than 2.0% by weight.

5. A semiconductor processing apparatus in accordance with claim 4, wherein said magnesium content ranges from about 0.1% to about 1.5% by weight.

6. A semiconductor processing apparatus comprising a complex-shaped aluminum article having a frictional welded area, wherein at least a portion of said welded area has an aluminum oxide coating formed thereover, and wherein no more than 0.2% of particles in said aluminum article have a calculated effective diameter ranging between 50 μm and 20 μm, with the calculated effective diameter of all other particles being smaller, and wherein a variation in hardness between a weld line and a welded parent material is less than about 15%.

7. A semiconductor processing apparatus comprising a complex-shaped aluminum article having a frictional welded area, wherein at least a portion of said welded area has an aluminum oxide coating formed thereover, and wherein no more than 0.2% of particles in said aluminum article have a calculated effective diameter ranging between 50 μm and 20 μm, with the calculated effective diameter of all other particles being smaller, and wherein a difference in thickness of an aluminum oxide coating formed at a frictional welded area compared with a thickness of said aluminum oxide coating formed at a surface of said aluminum article which is not welded is less than about 10%.

8. A semiconductor processing apparatus in accordance with claim 4, wherein a difference in thickness of an aluminum oxide coating formed at a frictional welded area compared with a thickness of said aluminum oxide coating formed at a surface of said aluminum article which is not welded is less than about 10%.

9. A semiconductor processing apparatus in accordance with claim 5, wherein a difference in thickness of an aluminum oxide coating formed at a frictional welded area compared with a thickness of said aluminum oxide coating formed at a surface of said aluminum article which is not welded is less than about 10%.

10. A semiconductor processing apparatus in accordance with claim 6, wherein a difference in thickness of an aluminum oxide coating formed at a frictional welded area compared with a thickness of said aluminum oxide coating formed at a surface of said aluminum article which is not welded is less than about 10%.

11. A semiconductor processing apparatus in accordance with claim 1, wherein no more than 0.1% of said particles have a calculated effective diameter ranging between 50 μm and 20 μm.

12. A semiconductor processing apparatus in accordance with claim 1, wherein said calculated effective diameter ranges between 40 μm and 20 μm.

13. A semiconductor processing apparatus in accordance with claim 11, wherein said calculated effective diameter ranges between 40 μm and 20 μm.

14. A semiconductor processing apparatus in accordance with claim 3, wherein no more than 0.1% of said particles have a calculated effective diameter ranging between 50 μm and 20 μm.

15. A semiconductor processing apparatus in accordance with claim 3, wherein said calculated effective diameter ranges between 40 μm and 20 μm.

16. A semiconductor processing apparatus in accordance with claim 14, wherein said calculated effective diameter ranges between 40 μm and 20 μm.

17. A semiconductor processing apparatus in accordance with claim 4, wherein no more than 0.1% of said particles have a calculated effective diameter ranging between 50 μm and 20 μm.

18. A semiconductor processing apparatus in accordance with claim 4, wherein said calculated effective diameter ranges between 40 μm and 20 μm.

19. A semiconductor processing apparatus in accordance with claim 17, wherein said calculated effective diameter ranges between 40 μm and 20 μm.

20. A semiconductor processing apparatus in accordance with claim 6, wherein no more than 0.1% of said particles have a calculated effective diameter ranging between 50 μm and 20 μm.

21. A semiconductor processing apparatus in accordance with claim 6, wherein said calculated effective diameter ranges between 40 μm and 20 μm.

22. A semiconductor processing apparatus in accordance with claim 20, wherein said calculated effective diameter ranges between 40 μm and 20 μm.

23. A semiconductor processing apparatus in accordance with claim 7, wherein said calculated effective diameter ranges between 40 μm and 20 m.

\* \* \* \* \*